US009415941B2

United States Patent
Woiler et al.

(10) Patent No.: US 9,415,941 B2
(45) Date of Patent: Aug. 16, 2016

(54) VIBRATION GENERATING ASSEMBLY

(71) Applicants: Christopher Woiler, College Place, WA (US); Dean Dunham, Walla Walla, WA (US)

(72) Inventors: Christopher Woiler, College Place, WA (US); Dean Dunham, Walla Walla, WA (US)

(73) Assignee: Key Technology, Inc, Walla Walla, WA (US)

( * ) Notice: Subject to any disclaimer, the term of this patent is extended or adjusted under 35 U.S.C. 154(b) by 0 days.

(21) Appl. No.: 14/755,832

(22) Filed: Jun. 30, 2015

(65) Prior Publication Data

US 2016/0046449 A1 Feb. 18, 2016

Related U.S. Application Data

(63) Continuation-in-part of application No. 14/460,210, filed on Aug. 14, 2014, now Pat. No. 9,181,037.

(51) Int. Cl.
  *B65G 27/06* (2006.01)
  *B65G 27/24* (2006.01)
  *B65G 27/04* (2006.01)
  *B65G 27/32* (2006.01)

(52) U.S. Cl.
  CPC ............. *B65G 27/24* (2013.01); *B65G 27/04* (2013.01); *B65G 27/32* (2013.01)

(58) Field of Classification Search
  CPC ......... B65G 27/32; B65G 27/24; B65G 27/16
  USPC ............... 198/758, 759, 766, 769, 751, 752.1
  See application file for complete search history.

(56) References Cited

U.S. PATENT DOCUMENTS

| 3,155,163 | A | 11/1964 | Bodine, Jr. | |
|---|---|---|---|---|
| 3,509,948 | A | 5/1970 | Besnard | |
| 3,581,871 | A * | 6/1971 | Forman | B65G 27/00 177/121 |
| 4,014,403 | A | 3/1977 | Mifsud | |
| 4,378,064 | A | 3/1983 | Brown | |
| 4,961,491 | A | 10/1990 | Falconer | |
| 5,054,606 | A * | 10/1991 | Musschoot | B65G 27/32 198/751 |
| 5,313,025 | A | 5/1994 | Roessler et al. | |
| 5,462,155 | A * | 10/1995 | Demar | B65G 27/30 198/752.1 |
| 6,079,550 | A | 6/2000 | Gilman | |
| 6,131,461 | A | 10/2000 | Leist | |
| 6,179,117 | B1 | 1/2001 | Gilman | |
| 6,189,683 | B1 * | 2/2001 | Svejkovsky | B65G 27/08 198/750.7 |
| 6,253,908 | B1 | 7/2001 | Gilman | |
| 6,389,900 | B1 | 5/2002 | Leist et al. | |
| 6,571,637 | B2 | 6/2003 | Leist et al. | |
| 6,851,511 | B2 | 2/2005 | Tenghamn | |
| 6,904,807 | B1 | 6/2005 | Butts | |
| 6,994,297 | B1 * | 2/2006 | Hassan | B64C 9/38 244/204 |
| 7,784,604 | B2 * | 8/2010 | Boeger | B65G 27/24 198/753 |
| 8,511,400 | B2 | 8/2013 | Catoi et al. | |

(Continued)

*Primary Examiner* — James R Bidwell
(74) *Attorney, Agent, or Firm* — Randall Danskin PS

(57) ABSTRACT

A vibration generating assembly is described, and which includes an exterior housing having an internal cavity, and opposite first and second ends; a reciprocally moveable carriage which is biasingly supported within the internal cavity of the housing; and an electrical transducer have a magnet which is supported by and reciprocally moveable relative to the biasingly supported carriages, and the electrical transducer has a fixed cylindrically shaped electrical coil which is mounted on the exterior housing.

21 Claims, 7 Drawing Sheets

(56) References Cited

U.S. PATENT DOCUMENTS

| | | |
|---|---|---|
| 8,561,962 B1 | 10/2013 | Butts |
| 2001/0019008 A1 | 9/2001 | Gilman |
| 2002/0088693 A1* | 7/2002 | Takasan .................. B65G 54/00 198/752.1 |
| 2003/0034228 A1* | 2/2003 | Takasan .................. B65G 27/00 198/752.1 |
| 2006/0096840 A1* | 5/2006 | Kato ....................... B65G 27/12 198/767 |
| 2013/0037389 A1* | 2/2013 | Millard .................. B65G 27/24 198/758 |

* cited by examiner

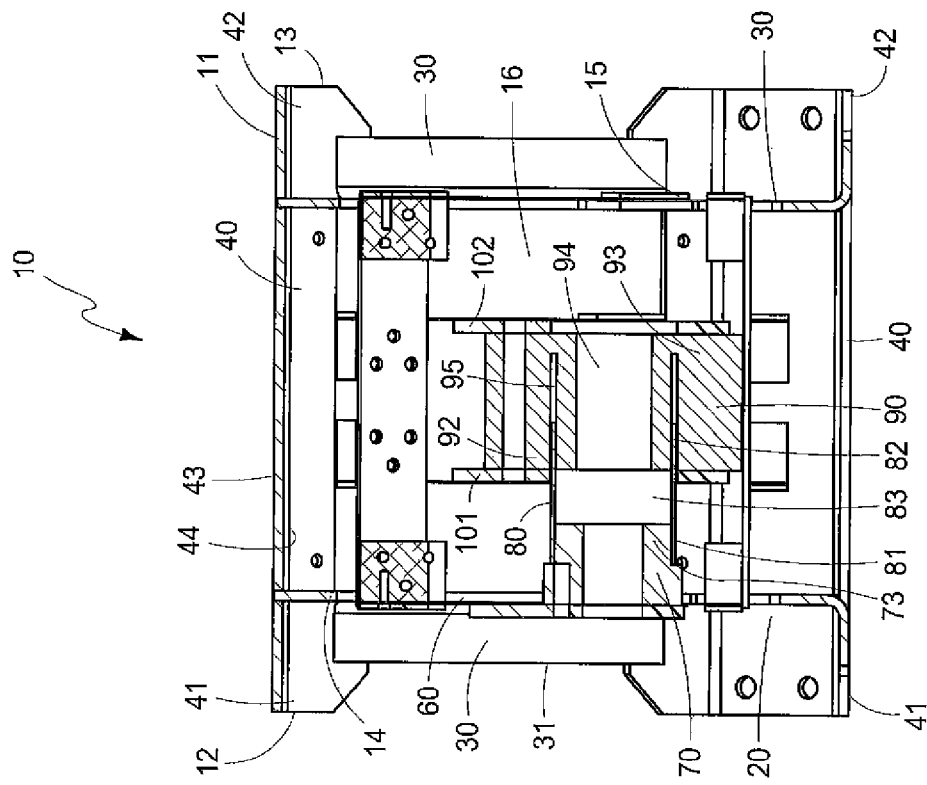
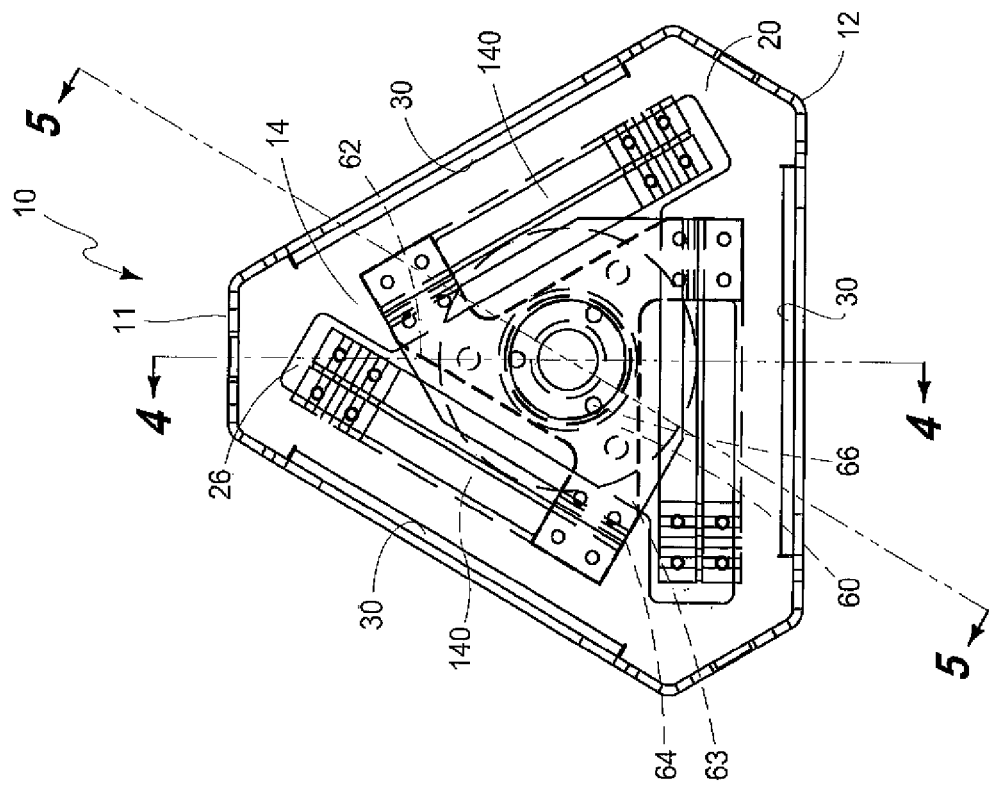

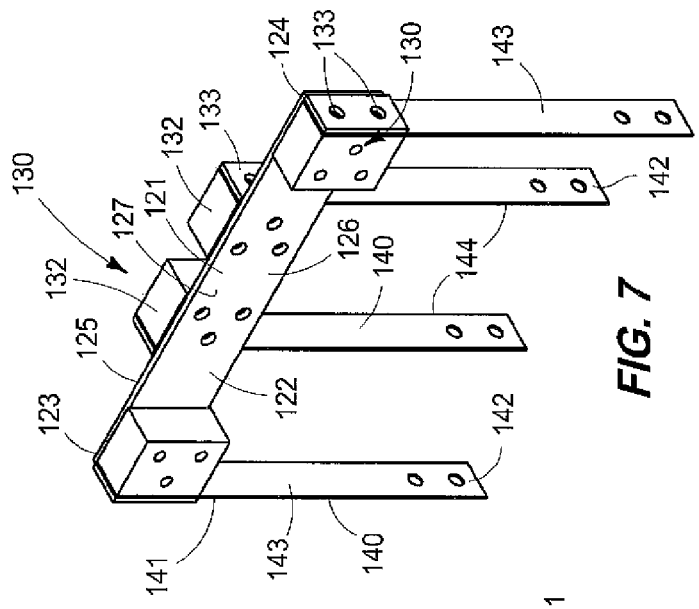
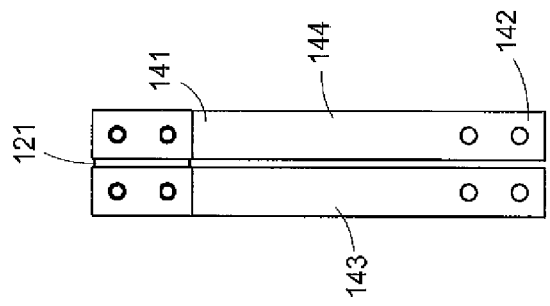
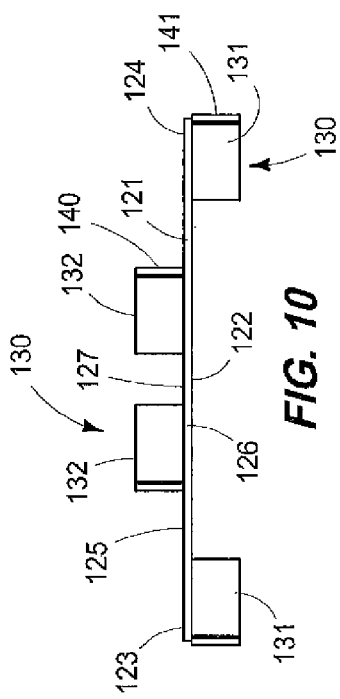
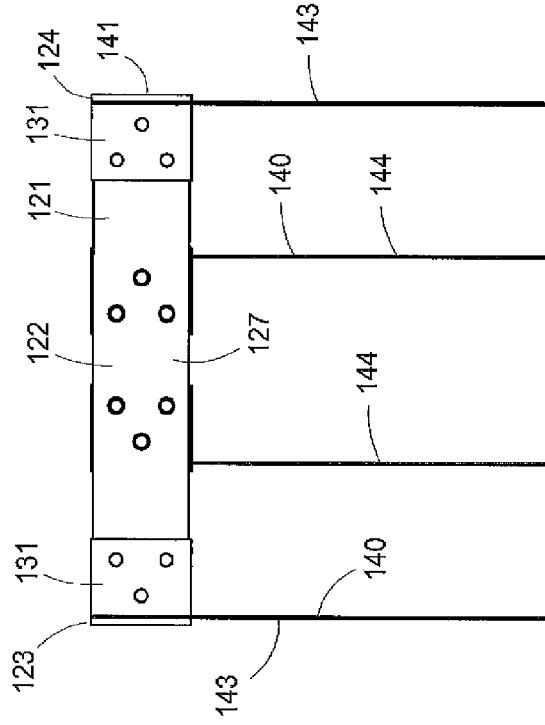

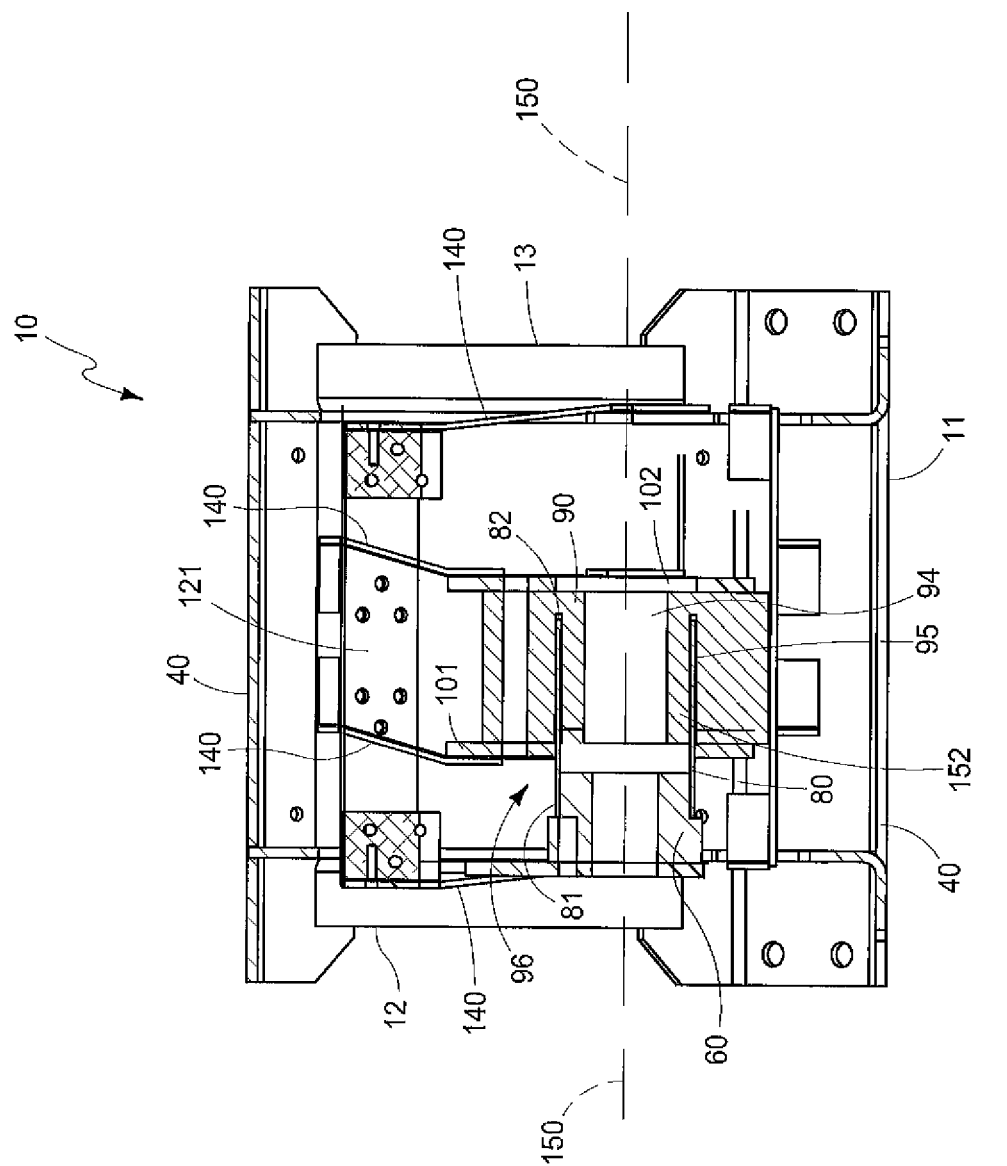

VIBRATION GENERATING ASSEMBLY

TECHNICAL FIELD

The present invention relates to a vibration generating assembly, and more specifically to an assembly which employs a reciprocally moveable reactive mass to generate a predetermined force along a linear path of travel.

BACKGROUND OF THE INVENTION

In U.S. patent application Ser. No. 14/460,210, and from which the present application claims priority, a conveyor assembly is described and which includes a reactive mass electrical transducer which is oriented or positioned in spaced relation relative to a conveyor bed and which further, when energized, imparts reciprocal motion to the conveyor bed so as to move a given product along a product conveying surface of the conveyor bed in a rather novel manner.

The conveyor assembly as described in the aforementioned patent application avoids many of the prior art problems associated with the earlier disclosed excited frame conveyor assemblies which have been employed in various work environments, and which utilize out-of-balance motors to cause reciprocal motion of a conveyor bed. These out-of-balance motors normally utilize eccentric weights and which been employed, heretofore, to generate vibratory energy and which further imparts motion to these excited frame conveyor designs. The prior art problems associated with these out-of-balance motors is well known. In this regard it has long been known that the prior art out-of-balance motors, from time to time, need to be repaired or replaced due to excessive bearing wear. Further, other problems have presented themselves regarding the operational adjustment of the resulting conveyor device after installation. For example, one of the shortcomings noted in the prior art practices is that, depending upon the weight of the product being transported by the conveyor bed, an adjustment of the vibratory force which is imparted to the conveyor bed is often difficult to make absent a replacement of the respective eccentric weights, and which are rotated by the out-of-balance motors which drive the conveyor bed. The changing of these weights frequently take some period of time to accomplish. Consequently, there is no readily convenient means by which both the frequency and the amplitude of the force which is generated by an out-of-balance motor, and which is provided to a conveyor bed can be made, absent significant alterations being made to the drive arrangement of such prior art excited frame conveyors.

In addition to the shortcomings, noted above, the prior art out-of-balance motors also have had problems when used on extremely long conveyors. These longer conveyors have often employed a multitude of out-of-balance motors, at given locations along the length of the conveyor bed. In these prior art devices, a rather complex control system for energizing and de-energizing these motors was previously developed, and is currently employed to inhibit adverse movement of the conveyor bed upon starting or stopping the conveyor.

While the invention as described in the aforementioned co-pending patent application works with a great deal of success, some problems begin to arise when the reactive mass as employed with same begins to increase in size and weight. Of course, the weight of the reactive mass employed with devices as shown in this patent application would increase rather significantly as the length of the conveyor bed increased in length.

The present invention, as described, hereinafter, provides a convenient means for addressing the problems associated with using a larger reactive mass, having greater weight, and which is used to generate the predetermined forces which are employed for various industrial applications such as reciprocating an excited conveyor assembly as seen in the prior art. A vibration generating assembly which avoids the detriments associated with the prior art practices which have been utilized, heretofore, is the subject matter of the present application.

SUMMARY OF THE INVENTION

A first aspect of the present invention relates to a vibration generating assembly which includes, an exterior housing which defines an internal cavity, and wherein the exterior housing has opposite first and second ends; a reciprocally moveable carriage which is biasingly supported within the internal cavity of the housing; and an electrical transducer having a magnet, and which is supported by, and reciprocally moveable relative to, the biasingly supported carriage, and wherein the electrical transducer further has a fixed, cylindrically shaped electrical coil which is mounted on the exterior housing, and wherein the magnet comprises a reciprocally moveable reactive mass, which is concentrically mounted in spaced, coaxially relation relative to the fixed, cylindrically shaped electrical coil, and wherein the selective energizing of the electrical transducer imparts reciprocal motion of the reactive mass and so generates a reciprocal force which is directed along a predetermined linear path of travel.

Still another aspect of the present invention relates to a vibration generating assembly which includes, an exterior housing having opposite first and second ends, and which further defines an internal cavity; a moveable carriage which is biasingly supported within the internal cavity of the exterior housing, and which is further formed, at least in part, of a multiplicity of elongated, and spaced support members which have opposite ends, and wherein the opposite ends of each of the spaced support members are biasingly affixed to the most closely adjacent end of the exterior housing, by a first plurality of elongated, and planar leaf springs, and wherein the moveable carriage further includes a second plurality of elongated, and planar leaf springs which are mounted on the respective support members, and which further extend laterally, outwardly relative thereto; an internal frame having two frame members which are disposed in predetermined, spaced relation, one relative to the other, and wherein each frame member has a polygon-shaped main body which has a peripheral edge, and wherein the main body of each frame member has at least 3 major sides, and 3 principal vertices, and wherein the second plurality of elongated, and planar leaf springs are individually, biasingly affixed to each of the principal vertices of each of the frame members, and wherein the internal frame, and the moveable carriage are each reciprocally moveable within the internal cavity of the exterior housing, one, relative to the other; and an electrical transducer having a magnet, with a main body, and which has opposite first and second ends, and wherein the magnet is positioned between, and is supported by, the spaced frame members, and wherein the magnet has a given weight, and wherein the magnet further defines an annular shaped passageway which extends from the first end of the magnet, and in the direction of the second end, and wherein the annular shaped passageway has a predetermined diametral dimension, and wherein the electrical transducer further comprises a cylindrically shaped electrical coil which has a predetermined outside diametral dimension, and which allows the cylindrically shaped electrical coil to be telescopingly received, at least in part, within the annular shaped passageway, and wherein the cylindrically shaped electrical coil has a first end which is immovably attached to one end of the exterior housing, and a second end which is received within the annular shaped passageway, and the selective energizing of the transducer by supplying a periodic source of electricity to the cylindrically shaped electrical coil is effective in biasingly reciprocating the magnet along a linear path.

These and other aspects of the present invention will be discussed in greater detail hereinafter.

BRIEF DESCRIPTION OF THE DRAWINGS

Preferred embodiments of the invention are described, below, with reference to the following accompanying drawings:

FIG. 3 is an end view of the vibration generating assembly of the present invention.

FIG. 4 is a transverse, vertical, sectional view of the vibration generating assembly, and which is taken from a position along line 4-4 of FIG. 3.

FIG. 7 is a perspective, side elevation view of a support member which forms a portion of a moveable carriage, and which further forms a feature of the present invention.

FIG. 8 is a side elevation view of the support member as seen in FIG. 7.

FIG. 9 is an end view of the support member as seen in FIG. 7.

FIG. 10 is a top, plan view of the support member as seen in FIG. 7.

FIG. 11B is a side elevation view of the present invention shown in a second operational position.

DETAILED DESCRIPTION OF THE PREFERRED EMBODIMENT

This disclosure of the invention is submitted in furtherance of the constitutional purposes of the U.S. Patent Laws "to promote the progress of science and the useful arts" [Art. I, Sec. 8].

Figure 1:
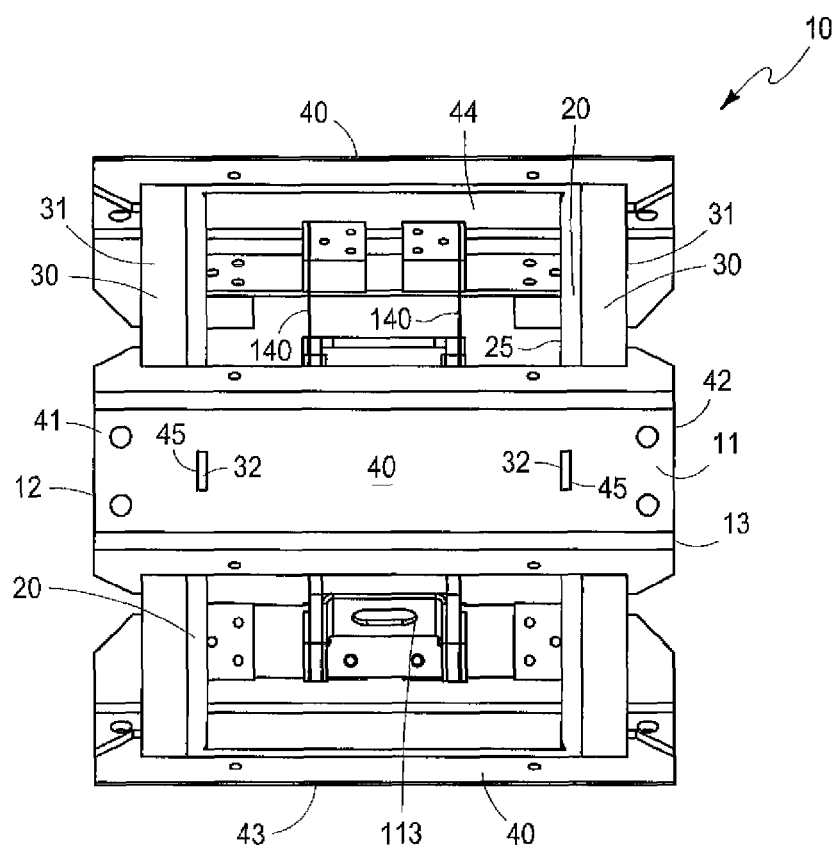
FIG. 1 is a side elevation view of the vibration generating assembly of the present invention.
Figure 2:
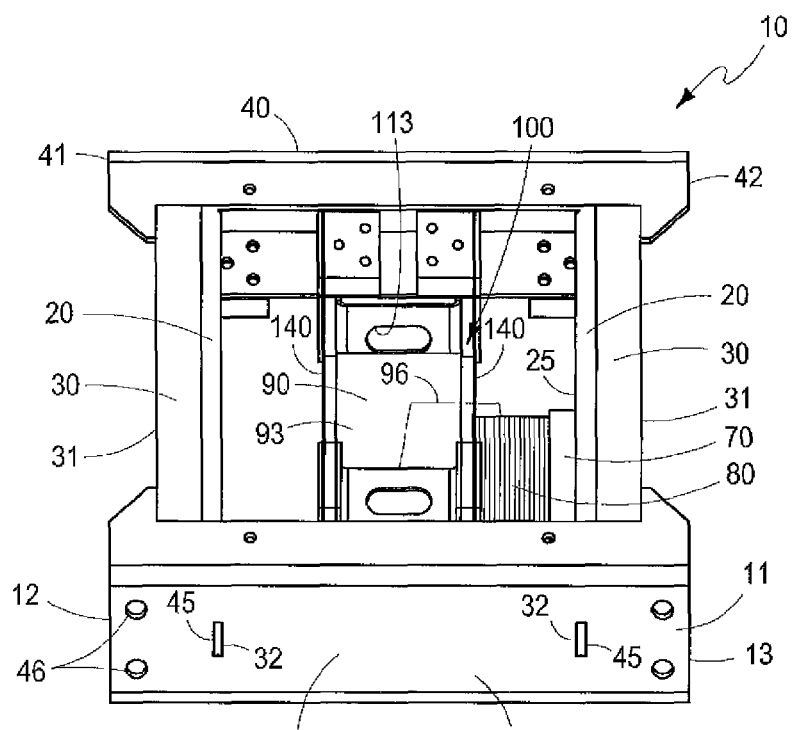
FIG. 2 is a second, side elevation view of the vibration generating assembly of the present invention and which is taken from a position of about 90 degrees offset from that view as seen in FIG. 1.
Figure 5:
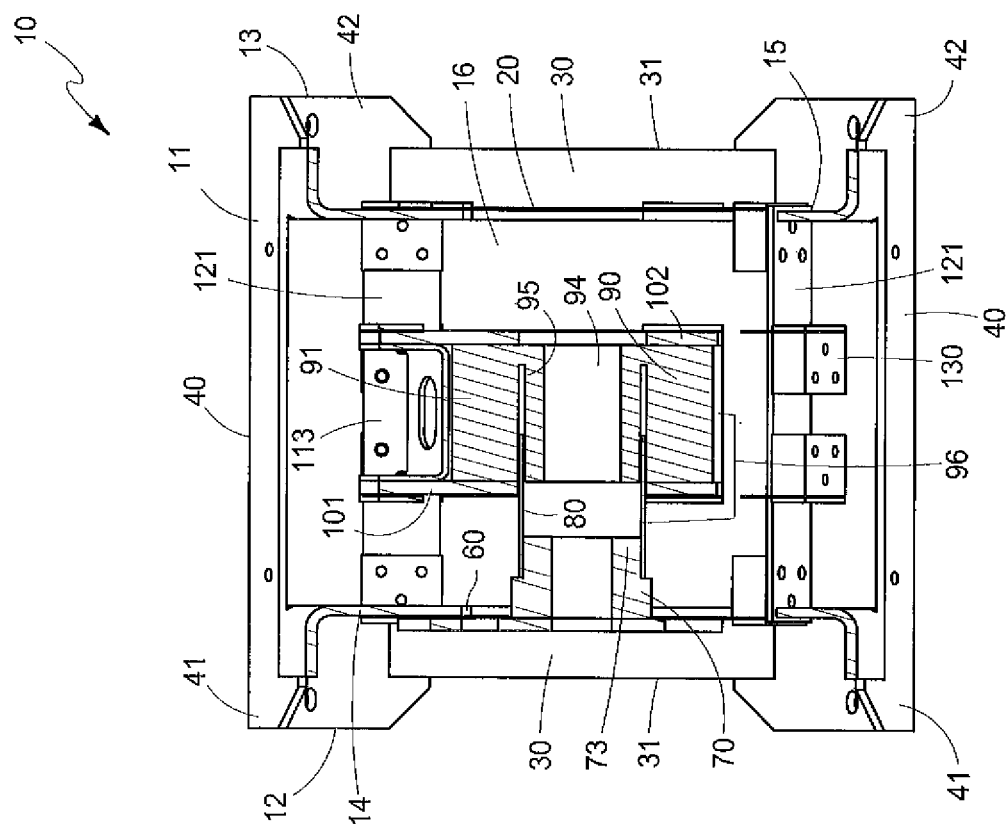
FIG. 5 is a second, transverse, vertical, sectional view, and which is taken from a position along line 5-5 of FIG. 3.

The vibration generating assembly of the present invention is generally indicated by the numeral 10, in FIG. 1, and following. The vibration generating assembly 10 has an exterior housing which is generally indicated by the numeral 11 in the drawings. The exterior housing 11 has opposite first and second ends 12 and 13, respectively. The exterior housing is formed, at least in part, of a first end plate 14, and a second end plate 15. These end plates are of substantially similar design, and will be described in the paragraphs which follow. The vibration generating assembly 10 further defines an internal cavity 16 which is located between the respective end plates, and within which other components of the vibration generating assembly 10 are located and operate.

The first and second end plates 14 and 15 of the exterior housing 11 each have a main body which is generally indicated by the numeral 20. The main body is generally triangular in shape, and is defined by a peripheral edge 20, which forms a multiplicity of sides. The general, triangular shape of the main body 20 defines, at least in part, multiple vertices 22. As seen in the exploded view of FIG. 6, the main body 20 includes individual assembly tabs 23 which are located near or in the vicinity of the vertices 22, and which extend laterally, outwardly relative thereto. The respective assembly tabs 23 are operable to cooperate with individual side plates as will be discussed in greater detail, below. The main body 20, of the respective first and second end plates 14 and 15, each have an outside facing surface 24, and an opposite, inside facing surface 25. Still further, the main body 20 of the end plates 14 and 15, respectively, define an irregularly shaped, and centrally disposed aperture 26. Mounted on, and extending in a direction which is laterally outwardly relative thereto, the respective end plates further include elongated, reinforcement members 30 which are disposed substantially along a portion of the peripheral edge 21 of the main body. The individual reinforcement members 30 each have a distal edge 31 which is generally located in a parallel-plane relationship with the peripheral edge 21. The individual reinforcement members 30 increase the strength of the main body 20 of each of the end plates, and further provides a means for coupling the individual end plates 14 and 15, respectively, to individual side plates as will be discussed in greater detail, below. As further seen in FIG. 6, individual mounting tabs 32, extend laterally, inwardly, and into the aperture 26. The individual mounting tabs are located in predetermined spaced relation, one relative to the others. Further, individual fastener apertures 33 are formed in each of the respective mounting tabs 32. The function of these mounting tabs 32 will be discussed in greater detail in the paragraphs, below.

Figure 6:
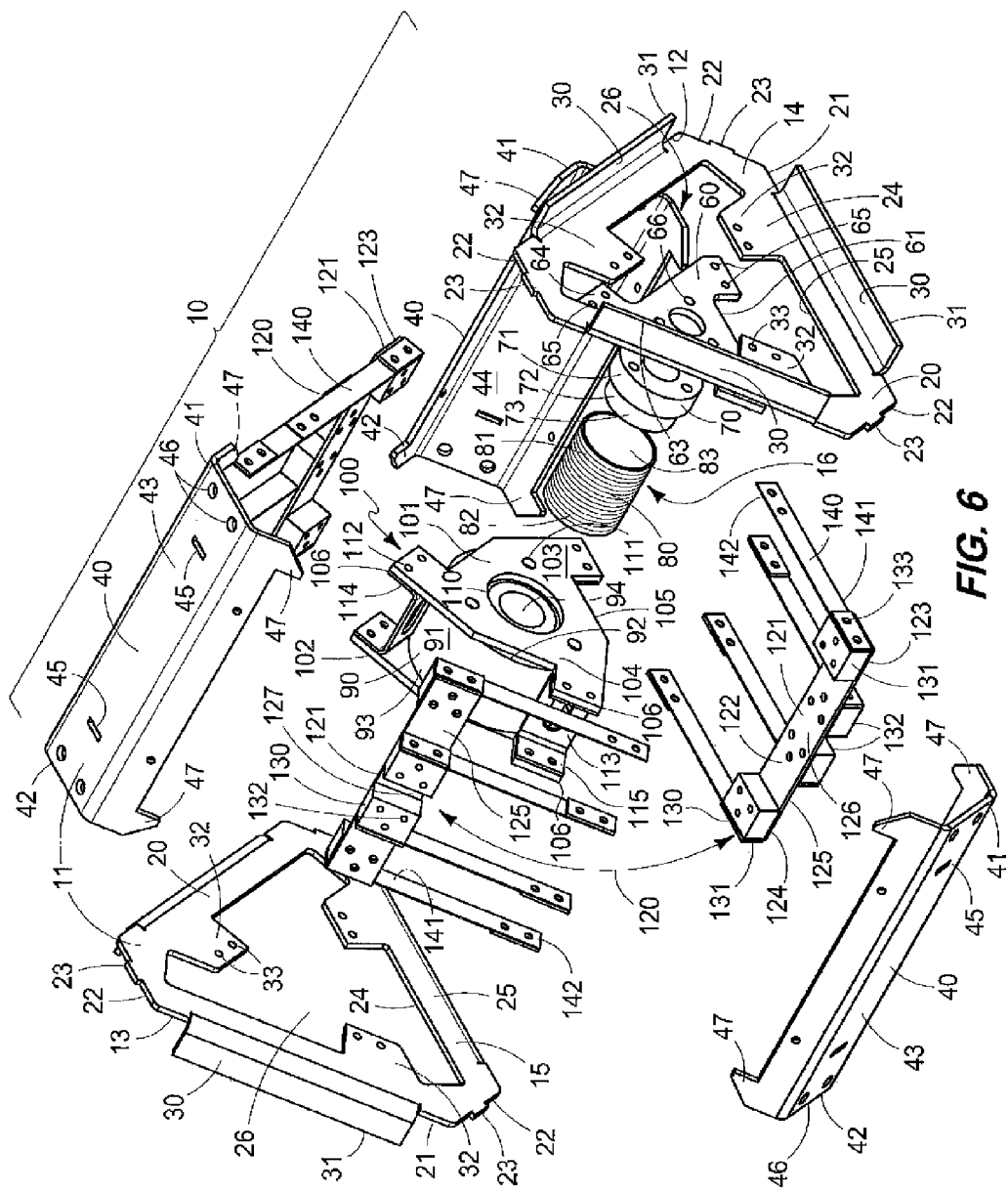
FIG. 6 is a perspective, exploded, side elevation view of the vibration generating assembly of the present invention.

The exterior housing 11 further includes multiple side plates which are generally indicated by the numeral 40. The individual side plates are operable to engage, and extend between, the individual vertices 22 of each of the first and second end plates 14 and 15, respectively. The multiple side plates 40 are conformably shaped so as to rest, in part, on, and engage the individual vertices 22, and also conformably engage or mate with a portion of the peripheral edge 21, of the main body 20, of each of the first and second end plates 14 and 15. In this regard, the multiple side plates 40 each have a first end 41; and an opposite second end 42. Each of the side plates 40 also are defined by an outside facing surface 43, and an inside facing surface 44. As seen in FIG. 6, each of the side plates 40 has an assembly tab aperture 45 which is formed in a location which is spaced from the opposite first and second ends 41 and 42, respectively. The individual assembly tab apertures 45 are sized so as to conformably receive or mate with the individual assembly tabs 23, and which extend laterally outwardly relative to the respective vertices 22. Once received within the assembly tab aperture 45, the assembly tabs are secured, therein, by welding or some other suitable fastening methodology. In the arrangement as seen in FIG. 6 the individual side plates 40 include a pair of mounting apertures 46, and which are formed near the opposite first and second ends 41 and 42, respectively. Still further, the respective side plates 40 each include opposite pairs of engagement flanges 47, and which are mounted on, or made integral with the opposite first and second ends 41 and 42, respectively. The respective engagement flanges 47 are spaced from engagement flanges on the opposite end of the side plate 40, by a given distance, and which is equal to the distance as measured between the distal edge 31 of the individual reinforcement members 30 when the respective first and second end plates 13 and 14 are appropriately oriented and received in a mounted or fixed relationship relative to the assembly tab aperture 45. In the arrangement as seen in FIG. 1, and following, the respective engagement flanges 47 mateably and forcibly engage the distal edges 31 of the respective individual reinforcement members 30 as the assembly tabs 23 are received within the assembly tab apertures 45. Again, the side plates 40 are secured to the first and second end plates 14 and 15 by suitable fastening techniques such as welding, and the like. The respective side plates 40, and end plates 14 and 15, respectively, form a ridged exterior housing 11, and which defines the internal cavity 16. As noted, earlier, other components are mounted within the external cavity, and which will be discussed in the paragraphs, below.

Referring more specifically to FIG. 3 and FIG. 6 the vibration generating assembly 10 includes a coil mounting plate which is generally indicated by the numeral 60, and which is further affixed to, or otherwise cooperates with, the first end plate 14. The coil mounting plate 60 has a main body 61 which is defined by a peripheral edge 62. The main body 61 also includes a multiplicity of outwardly extending engagement or support arms 63. The outwardly extending engagement or support arms each have a distal end 64. These distal ends 64 have fastener apertures 65, which are formed in a given pattern, and which allows the fastener apertures 65 to be coaxially aligned relative to the fastener apertures 33. The fastener apertures 33 are formed in the respective mounting tabs 32. Fasteners having an appropriate size are passed through the coaxially aligned apertures thereby securing the coil mounting plate 60 in a partially occluding orientation or relationship relative to the irregular shaped aperture 26, and which is formed in the main body 20 of each of the end plates 14 and 15, respectively. As seen in FIG. 6, a multiplicity of fastener apertures 66 are formed in the main body 61, and are operable to cooperate with fasteners (not shown), and which further affix a coil supporting member to the coil mounting plate 60 as will be described, below. The respective outwardly extending engagement arms 63 are arranged, and shaped, in a fashion so as to allow a portion of the individual support members, as will be discussed in greater detail, below, to moveably cooperate with the respective end plates 14 and 15, in the manner as will be discussed in the paragraphs which follow.

The vibration generating assembly 10 of the present invention includes an electrical coil support member which is generally indicated by the numeral 70, and which further is affixed to the coil mounting plate 60 as described in the paragraph, above. The coil support member 70 has a base portion 71, and which has formed therein a multiplicity of fastener apertures 72. The fastener apertures 72 are formed in a predetermined spatial pattern which matches the spatial pattern of the fastener apertures 66, and which are formed in the main body 61 of the coil mounting plate 60. Individual fasteners (not shown) attach the coil supporting member 70 to the main body 61 of the coil mounting plate 60. The coil support member further includes an internal supporting portion 73 which is cylindrically shaped, and which further has an outside diametral dimension which is less than the outside diametral dimension of the base portion 71. The internal supporting portion 73 extends longitudinally, inwardly, relative to the coil mounting plate 60, and into the internal cavity 16 of the exterior housing 11. An electrical coil 80 of conventional design is formed into a given shape so as to provide an inside diametral dimension which is operable to matingly cooperate with the coil supporting member 70. The electrical coil 80 has a first end 81, which matingly cooperates or is otherwise immovably secured to the internal supporting portion 73, and an opposite, or distal, second end 82. The electrical coil has an outside diametral dimension which is operable to movably and matingly cooperate within an annular-shaped channel which is made integral with, or formed within, a magnet as will be discussed in greater detail, hereinafter. As further seen in FIG. 6, the electrical coil 80 defines a cylindrically shaped and longitudinally extending passageway 83 which extends between the first and second ends 81 and 82, respectively. The internal supporting portion 73 of the coil supporting member 70 is telescopingly received within the longitudinally extending passageway 83, and the first end 81 abuts the base portion 71. The cylindrically shaped electrical coil 80 is fixed onto, and is immovable relative to, the exterior housing 11, and further moveably cooperates with a magnet which will be described in the paragraph which follows, when the electrical coil 80 is selectively energized by a power source, not shown.

The vibration generating assembly 10 of the present invention includes a magnet 90, of conventional design, and which has a given mass. The magnet 90, which operates as a reciprocally moveable reactive mass for the present invention, has an annular shaped main body 91, and which has a first end 92, and an opposite, second end 93. The magnet 90 may either be in the form of a permanent magnet, or an electromagnet. The annular shaped main body 91 is reciprocally movable along a predetermined path of travel which will be discussed in greater detail, hereinafter, in order to generate a predetermined vibratory force which can then be used for various purposes. The magnet 90 has a centrally disposed and cylindrically shaped passageway 94, and which extends between the first and second ends 92 and 93, thereof. Still further, the magnet 90 further defines an annular shaped passageway 95 having predetermined diametral dimensions, and which is further located radially, outwardly, relative to the centrally disposed passageway 94. The annular shaped passageway 95 extends from the first end 92, and in the direction of the second end 93. The cylindrically shaped electrical coil 80 has an outside diametral dimension which is similar to the outside diametral dimension of the annular shaped passageway 95. In view of these dimensional relationships it should be understood that the cylindrically shaped electrical coil 80 is telescopingly received within, and is reciprocally movable relative to, the annular shaped passageway 95. The operable combination of the magnet, and electrical coil 80 forms an electrical transducer 96, which, in the present invention, may be selectively energized in a manner such that it imparts reciprocal motion to the movable reactive mass, here comprising the magnet 90, and thus generates a reciprocal force which is directed along a predetermined linear path of travel as will be discussed, below.

The vibration generating assembly 10 has an internal frame 100 which is best understood by a study of FIG. 6. The internal frame 100, which is reciprocally movable along a predetermined path of travel, as will be discussed, below, is formed of a first frame member 101, and a second frame member 102. The internal frame 100, and in particular the first and second frame members 101 and 102, are each formed of a polygon-shaped main body which is generally indicated by the numeral 103. The polygon-shaped main body 103 is somewhat triangular in shape, and is defined by a peripheral edge 104. The peripheral edge 104, as illustrated, includes three major sides which are generally indicated by the numeral 105, and three principal vertices which are generally indicated by the numeral 106. The polygon-shaped main body 103 has a given shape which allows it to matingly cooperate, at least in part, with the respective first and second end plates 14 and 15, and more specifically the irregular shaped aperture 26 that is defined thereby (FIG. 3). In the arrangement as seen in FIG. 6, it will be understood that the polygon-shaped main body 103 of the internal frame 100 defines a centrally disposed aperture 110. The aperture 110 has a diametral dimension which is greater than the diametral dimension of the annular shaped passageway 95, and which is positioned radially outwardly relative to the centrally disposed passageway 94 of the magnet 90. Still further, mounting apertures 111 are formed in the main body 103, and allow for fasteners (not shown) to pass therethrough, and which threadably engage the annular shaped main body 91 of the magnet 90. Additionally, as will be seen, fastener apertures 112 are formed in the vicinity of the three principal vertices 106 that the polygon-shaped main body 103 forms. These fastening apertures 112 are formed in a given pattern such that these fastening apertures can cooperate with fasteners which secure the ends of a multiplicity of planar leaf springs thereto. The planer leaf springs will be discussed in greater detail, below. As seen in FIG. 6, individual fastening plates 113 are provided and which secure the first and second frame members 101 and 102 together. The fastening plates 113 have a first end 114 which is affixed to the first frame member 101, and an opposite second end 115, and which is attached to the second frame member 102. The internal frame 100, when assembled, secures or otherwise positions the annular shaped main body 91, of the magnet 90, in a given orientation so as to expose or render accessible the annular shaped passageway 95, and further permits the electrical coil 90 to pass therethrough, and reciprocally move within the annular shaped passageway 95, of the magnet 90, when the electrical coil is selectively electrically energized. This selective energizing of the electrical coil 80 effects a reciprocal motion of the magnet 90, and which further acts as a reactive mass which creates a reciprocal force.

The vibration generating assembly 10 further includes a reciprocally moveable carriage which is generally indicated by the numeral 120, and which further is biasingly supported within the internal cavity 16 of the exterior housing 11. The reciprocally moveable carriage 120 is formed of a multiplicity of elongated and spaced support members which are generally indicated by the numeral 121. Each of the support members has a main body 122 which has a first end 123, and an opposite, second end 124. As will be seen from the drawings, and which will be discussed, below, the main body 122 of the spaced support members 121 are each biasingly affixed to each of the internal frame members 101 and 102, respectively, as will be discussed, hereinafter. As earlier discussed, the first and second frame members 101 and 102 are each affixed to the annular shaped main body 91 of the magnet 90. The respective spaced support members 121 are located in an orientation where they are respectively located, laterally, outwardly relative to the reciprocally moveable magnet 90, and in parallel, spaced relation relative to a predetermined linear path of travel, and which will be discussed in greater detail, hereinafter. The internal frame 100 is reciprocally moveable relative to the respective spaced support members 121, and the spaced support members 121 are reciprocally moveable relative to the exterior housing 11. This reciprocal motion is enabled by a multiplicity of planar leaf springs which will be discussed in the paragraphs which follow. The individual elongated and spaced support members 121 have an outwardly facing surface 125, and an opposite, inwardly facing, and second surface 126. Still further each of the elongated, and spaced support members 121 has an intermediate portion 127 which is located between the first and second ends 123 and 124, thereof. As seen in FIGS. 6 through 9, the multiplicity of elongated, spaced support members 121 each have affixed thereto, spring mounting blocks which are generally indicated by the numeral 130. The spring mounting blocks include a first pair of mounting blocks 131 which are mounted on the second surface 126, and which are individually located near the first and second ends 123 and 124 of the main body 122. Still further, the spring mounting blocks 130 include a second pair of spring mounting blocks and which are generally indicated by the numeral 132, and which are further mounted on the outwardly facing surface 125, and on the intermediate portion 127 of the main body 122. As will be recognized, the individual spring mounting 130 blocks are located in predetermined, substantially equally spaced relation along the length of the spaced support members 121, as measured between the first and second ends 123 and 124 thereof. As will be recognized from the drawings, the respective mounting blocks 130 each have fastening apertures 133 formed therein, and which cooperate with individual fasteners (not shown). The fastening apertures 133 allow for the mounting or fixing of individual planar leaf springs on each spring mounting block as will be discussed in the paragraphs which follow.

The vibration generating assembly 10 of the present invention includes a multiplicity of narrowly elongated, and planar leaf springs which are generally indicated by the numeral 140. In the arrangement as seen in the drawings, the multiplicity of leaf springs 140 have substantially the same length dimension. However, in other possible forms of the invention the multiplicity of narrowly elongated, and planar leaf springs may have different length dimensions. The multiplicity of narrowly elongated, and planar leaf springs 140 have a first end 141, and an opposite second end 142. In the arrangement as seen in the drawings, the first end 141 of each of the leaf springs 140 are mounted in a given position on one of the support members 121, and which form a portion of the reciprocally moveable carriage 120. Still further the second end 142 of the multiplicity of narrowly elongated planar leaf springs 140 are mounted on either one of the two frame members 101 or 102, respectively, and which are mounted on the opposite ends of the magnet 90; or on the first or second end 12 or 13, respectively, of the exterior housing 11. The multiplicity of planar leaf springs 140, in combination, imparts reciprocal movement to the moveable magnet 90, so as to generate a resulting reciprocal force which is directed along a predetermined path of travel, and which is generally indicated by the numeral 150. In the arrangement as seen in the drawings, a first plurality 143 of elongated leaf springs 140 are individually mounted on each of the spring mounting blocks 130, and which are located on the outwardly facing first surface 125, and are further located or positioned near the first and second ends 123 and 124 of each of the support members 121. These respective leaf springs further biasingly secures each of the respective support members 121 to one of the first or second ends 12 and 13, of the exterior housing 11. Still further the multiplicity of narrowly elongated and planar leaf springs 140 includes a second plurality 144 and which are individually mounted on spring blocks 130, and which are located or positioned on the opposite, second surface 126, and further are positioned on the intermediate portion 127 of the respective support members 121. These particular leaf springs are further biasingly secured to one of the respective frame members 101 and 102. As seen in the drawings, the individual leaf springs 140 are all disposed in substantially parallel, spaced relation, one relative to the other. As should be understood from a study of the drawings (FIG. 10), the first and second plurality of leaf springs, 143 and 144, respectively, are disposed in offset relation one relative to the other. As also seen in the drawings (FIG. 6), the second end 142 of each of the second plurality of narrowly elongated and planar leaf springs 144 are individually mounted on each of the respective vertices 106 of the respective first and second frame members 101 and 102, respectively. The second plurality of leaf springs 144 are further oriented in a given angular orientation relative to one of the major sides 105 of the respective internal frame members 101 and 102, respectively (FIG. 3).

Figure 11A:
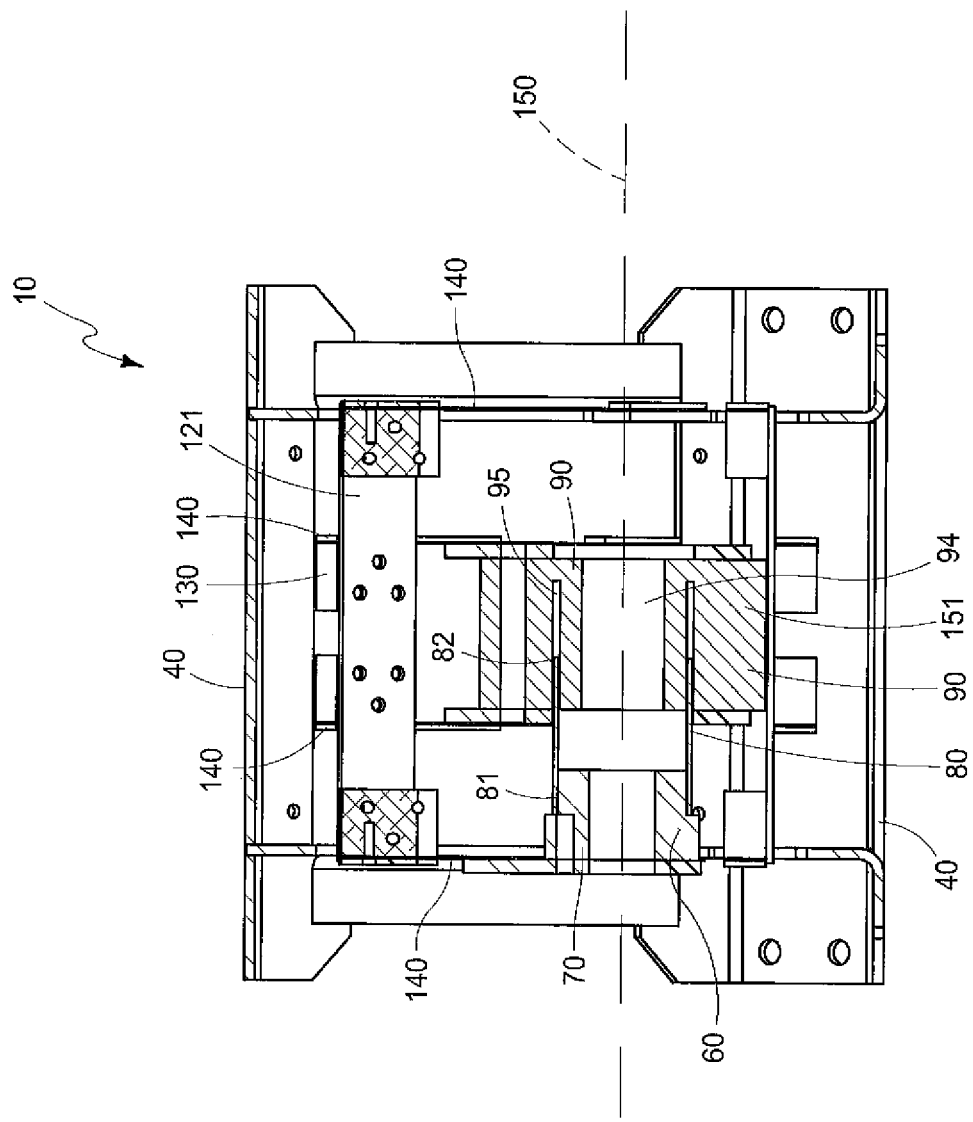
FIG. 11A is a side elevation view of the present invention shown in a first operational position.

Referring now to FIGS. 11A and 11B, respectively, the vibration generating assembly 10, and which has the electrical transducer 96, and which comprises the magnet 90, and the electrical coil 80, is operable when selectively energized, to exert a force which first draws the magnet 90 in a first, and/or opposite second direction along the predetermined path of travel 150 from a first, at rest position 151 (FIG. 11A), to a second position 152 (FIG. 11B). The electrical coil can be selectively energized so as to exert a force in either or both the first and second directions, respectively, in the manner of push-pull action along the path of travel 150. When this event occurs, the individual multiplicity of narrowly elongated and planar leaf springs 140, are placed either into compression, or tension. Further and when the electrical transducer 96 is de-energized, or when the electrical coil 80 is energized so as to cause movement in the opposite direction along the path of travel 150, this event allows the respective elongated leaf springs 140, which have been previously placed into tension or compression, to move the magnet 90, in a second direction from the second position 152, back towards the first position 151, and along the predetermined path of travel 150. The selective energizing of the transducer 96 in the foregoing fashion creates a push-pull reciprocal motion of the magnet 90, and a reciprocal force which is directed along the predetermined path of travel 150.

OPERATION

The operation of the described embodiment of the present invention 10 are believed to be readily apparent and briefly summarized at this point.

In its broadest aspect, the vibration generating assembly 10 of the present invention includes an exterior housing 11 which defines an internal cavity 16, and wherein the exterior housing 11 has opposite first and second ends 12 and 13 respectively. The vibration generating assembly 10 further includes a reciprocally moveable carriage 120 which is biasingly supported within the internal cavity 16 of the housing 11. Still further the invention 10 includes an electrical transducer 96 having a magnet 90, and which is further supported by, and reciprocally moveable relative to the biasingly supported carriage 120. The electrical transducer 96 further has a fixed, cylindrically shaped electrical coil 80 which is mounted on the exterior housing 11. The magnet 90 comprises a reciprocally moveable reactive mass and which is concentrically mounted in spaced, coaxial relation relative to the fixed, cylindrically shaped electrical coil 80. The selective energizing of the electrical transducer 96 imparts reciprocal motion of the moveable reactive mass (the magnet 90), and so generates a reciprocal force which is directed along a predetermined linear path of travel 150.

The vibration generating assembly 10 of the present invention further includes an internal frame 100 which is biasingly coupled to, and supported by the reciprocal moveable carriage 120. The internal frame 100 is mounted on the magnet 90, and supports the magnet 90 for predetermined reciprocal motion within the internal cavity 16 of the exterior housing 11. As shown in the drawings the magnet 90 is annular in shape, and has opposite first and second ends 92 and 93 respectively. The internal frame 100 comprises a pair of frame members 101 and 102, respectively, and which are located in predetermined spaced relation one relative to the other, and are further individually mounted on the opposite first and second ends 92 and 93 of the magnet 90. Each frame member 101 and 102, respectively, has a polygon-shaped main body 103 which has a peripheral edge 104. The peripheral edge 104 defines at least three major sides 105, and three principal vertices 106. The main body 103 of at least one of the respective frame members 101 and 102, has a centrally disposed aperture 110, and through which a portion of the cylindrically shaped electrical coil 80 passes, and which further operably, and matingly cooperates with the reciprocally moveable magnet 90, as the magnet 90 moves along in the predetermined, linear path of travel 150.

The vibration generating assembly of the present invention 10 includes a mounting plate 60 and which is affixed on at least one of the first or second ends 12 and 13, respectively, of the exterior housing 11. A cylindrically shaped electrical coil 80 has a main body with a first end 81, and which is secured to the mounting plate 60; and an opposite, second end 82, and which operably cooperates with the reciprocally moveable and annular shaped magnet 90 bu reciprocally moving along the annular shaped passageway 95.

The present invention 10 further includes a carriage 120 which is defined in part by a multiplicity of elongated and spaced support members 121. Each support member 121 has a main body 122 with opposite first and second ends 123 and 124 respectively. The main body 122 of the respective space support members 121 are each biasingly affixed to each of the internal frames 101 and 102, respectively. The main body 122 of the respective spaced support members 121 are located in an orientation which is spaced, laterally, outwardly relative to the reciprocally moveable magnet 90, and in parallel, spaced relation relative to the predetermined linear path of travel 150. The internal frame 100 is reciprocally moveable relative to the respective spaced support members 121. The spaced support members 121 are reciprocally moveable relative to the exterior housing 11. The respective spaced support members 121 are further biasingly coupled to each of the first and second ends 12 and 13 of the exterior housing 11.

The present carriage 120 further includes a multiplicity of narrowly elongated and planar leaf springs 140. The respective planar leaf springs 140 each have a first and second end 141 and 142 respectively. In the arrangement as seen in the drawings, the first end 141 of each of the leaf springs 140 are mounted in a given position on one of the support members 121, and which forms a portion of the carriage 120. The second end 142 of the respective leaf springs 140 are mounted on either one of the two frame members 101 or 102 respectively, and which are mounted on the opposite ends 92 or 93 of the magnet 90; or on the first or second end 12 or 13 of the exterior housing 11. The multiplicity of planar leaf springs 140, in combination, at least in part, support and encourage the reciprocal movement of the moveable magnet 90 so as to generate the resulting reciprocal force which is directed along the predetermined linear path of travel 150.

In the arrangement as seen in the drawings, the respective support members 120 which form the moveable carriage 120 each have an outwardly facing surface 125, an opposite second surface 126, and an intermediate portion 127 which is located between the first and second ends 123 and 124 thereof. A first plurality 143 of the elongated leaf springs 140 are mounted on the first surface 125, and are further located near the first and second ends 123 and 124 of each of the support members 121. This first plurality of leaf springs 143 biasingly secures each of the respective support members 121 to one of the first and second ends 112 and 113, respectively, of the exterior housing 11. A second plurality of the elongated and planar leaf springs 144, are mounted on the second surface 126, and further are located on the intermediate portion 127 of each of the respective support members 121. The second plurality of leaf springs 144 operate to biasingly secure the respective frame members 101 and 102 to the individual support members 121.

The vibration generating assembly 10 of the present invention, as noted earlier, includes a first plurality 143 of elongated leaf springs 140, and which have a similar length dimension; and a second plurality 144 of the elongated leaf springs 140 have a similar length dimension. As noted earlier, the second end 142 of the second plurality 144 of the elongated leaf springs 140 are individually mounted on each of the respective principal vertices 106, and are further oriented in a given angular orientation relative to one of the major sides 105, of the respective internal frame members 101, and 102, respectively. In the present invention, the second plurality 144 of the elongated leaf springs 140 are oriented in an acutely angular orientation relative to each other. As seen in FIG. 10, the respective first and second plurality of leaf springs 143, and 144, are disposed in substantially parallel, spaced relation one relative to the others. Still further the second plurality of elongated leaf springs 144 are offset relative to the first plurality of elongated leaf springs 143. In the arrangement as seen in the drawings, the reciprocating magnet 90, which forms the reciprocally moveable reactive mass, moves along the predetermined linear path of travel 150 without imparting a twisting distortion to the respective first and second plurality of elongated leaf springs 143 and 144, respectively. In the present invention 10 the annular shaped magnet 90 defines a centrally disposed passageway 94, and which is substantially coaxially aligned relative to the predetermined linear path of travel 150. The magnet 90 further defines an annular shaped passageway 95 having a predetermined diametral dimension, and which is further located radially, outwardly relative to the centrally disposed passageway 94. The cylindrically shaped electrical coil 80 has an outside diametral dimension which is similar to the diametral dimension of the annular shaped passageway 95. The cylindrically shaped electrical coil 80 is telescopingly received, and reciprocally moveable within the annular shaped passageway 95 as the electrical transducer 96 is selectively energized. In the form of the invention as illustrated, the length dimension of the first and second plurality of elongated leaf springs 143 and 144 are the same. However, in an alternative form of the invention, the length dimension of the elongated leaf springs 140 may be different.

In the present invention the electrical transducer 96, when energized, is operable to exert a force which draws the magnet 90 in a first direction along the predetermined, linear path of travel 150 (FIG. 11B), and which further forcibly bends and/or places into tension or compression, each of the elongated leaf springs 140. The electrical transducer 96, when de-energized, or when the electrical coil 80 is energized to impart motion in an opposite direction, further allows the respective elongated leaf springs 140 which have been previously placed into tension or compression to move the magnet 90 in a second direction, and which is opposite to the first direction (FIG. 11A). The selective energizing of the electrical coil 80 therefore is operable to produce a reciprocal motion of the magnet which facilitates the generation of a reciprocal force, and which is directed along the linear path of travel 150.

Therefore it will be seen that the vibration generating assembly 10 of the present invention 10 provides a convenient means by which a reciprocal force may be reliably generated, and directed along a predetermined path of travel 150 to achieve various objectives such as being employed as a drive assembly for use on excited frame conveyor similar to that which is disclosed in the earlier co-pending application.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the Doctrine of Equivalence.

We claim:

1. A vibration generating assembly, comprising:
    an exterior housing which defines an internal cavity, and wherein the exterior housing has opposite first and second ends;
    a reciprocally moveable carriage which is biasingly supported within the internal cavity of the housing; and
    an electrical transducer having a magnet and which is supported by, and reciprocally moveable relative to, the biasingly supported carriage, and wherein the electrical transducer further has a fixed, cylindrically shaped electrical coil which is mounted on the exterior housing, and wherein the magnet comprises a reciprocally moveable reactive mass which is concentrically mounted in spaced, coaxially relation relative to the fixed, cylindrically shaped electrical coil, and wherein the selective energizing of the electrical transducer imparts reciprocal motion of the moveable reactive mass and so generates a reciprocal force which is directed along a predetermined linear path of travel.

2. A vibration generating assembly as claimed in claim 1, and further comprising:
    an internal frame which is biasingly coupled to, and supported by the reciprocally moveable carriage, and wherein the internal frame is mounted on the magnet, and supports the magnet for predetermined reciprocal motion within the internal cavity of the exterior housing.

3. A vibration generating assembly as claimed in claim 2, and wherein the magnet is annular in shape, and has opposite first and second ends, and wherein the internal frame comprises at least two frame members which are located in predetermined, spaced relation, one relative to the other, and are further individually mounted on the opposite first and second ends of the magnet, and wherein each frame member has a polygon-shaped main body which has a peripheral edge, and wherein peripheral edge defines at least 3 major sides, and 3 principal vertices, and wherein the main body of at least one of the respective frame members has a centrally disposed aperture through which a portion of the cylindrically shaped electrical coil passes and operably cooperates with the reciprocally moveable magnet, as the magnet moves along the predetermined, linear path of travel.

4. A vibration generating assembly as claimed in claim 3, and further comprising:
    a mounting plate which is affixed on at least one of the first or second ends of the exterior housing, and wherein the cylindrically shaped electrical coil has a main body with a first end which is secured to the mounting plate, and an opposite, second end which operably cooperates with the reciprocally moveable and annular shaped magnet.

5. A vibration generating assembly as claimed in claim 4, and wherein the carriage further comprises:
    a multiplicity of elongated, and spaced support members, and wherein each support member has a main body with opposite first and second ends, and wherein the main body of the respective spaced support members are each biasingly affixed to each of the internal frames which are mounted on the annular shaped magnet, and to the opposite ends of the exterior frame, and wherein the main body of the respective spaced support members are located in an orientation which is laterally, outwardly relative to the reciprocally moveable magnet, and in parallel, spaced relation relative to the predetermined linear path of travel, and wherein the internal frame is reciprocally moveable relative to the respective, spaced support members, and the spaced support members are reciprocally moveable relative to the exterior housing, and wherein the respective spaced support members are biasingly coupled to each of the frame members.

6. A vibration generating assembly as claimed in claim 5, and wherein the carriage further comprises:
a multiplicity of narrowly elongated, and planar leaf springs, and wherein each of the planar leaf springs have a first and a second end, and wherein the first end of each of the leaf springs are mounted in a given position on one of the support members which form a portion of the carriage, and wherein the second end of the respective leaf springs are mounted on either one of the two frame members which are mounted on the opposite ends of the magnet, or on the first or second end of the exterior housing, and wherein the multiplicity of planar leaf springs, in combination, impart, at least in part, reciprocal movement to the moveable magnet so as to generate the resulting reciprocal force which is directed along the predetermined linear path of travel.

7. A vibration generating assembly as claimed in claim 6, and wherein the respective support members forming the moveable carriage each have an outwardly facing first surface, an opposite, second surface, and an intermediate portion which is located between the first and second ends thereof, and wherein a first plurality of the multiplicity of elongated leaf springs are mounted on the first surface, and are further located near the first and second ends of each of the support members, and further biasingly secures each of the respective support members to one of the first and second ends of the exterior housing, and wherein a second plurality of the elongated and planar leaf springs are mounted on the second surface, and further are located on the intermediate portion of each of the respective support members, and which further biasingly secure the respective frame members to the individual support members.

8. A vibration generating assembly as claimed in claim 7, and wherein the first plurality of elongated leaf springs have a similar length dimension; and the second plurality of elongated leaf springs have a similar length dimension; and wherein the second end of the second plurality of elongated leaf springs are individually mounted on each of the respective principal vertices, and are further oriented in a given angular orientation relative to one of the major sides of the respective internal frame members.

9. A vibration generating assembly as claimed in claim 8, and wherein the second plurality of the elongated leaf springs are oriented in an acutely angular orientation relative to each other, and wherein the respective first and second plurality of leaf springs are disposed in substantially parallel, spaced relation one, relative to the others, and wherein the second plurality of elongated leaf springs are offset relative to the first plurality of elongated leaf springs.

10. A vibration generating assembly as claimed in claim 9, and wherein the reciprocating magnet which forms the reciprocally moveable reactive mass moves along the predetermined linear path of travel without imparting a twisting distortion to the respective first and second plurality of elongated leaf springs.

11. A vibration generating assembly as claimed in claim 10, and wherein the annular shaped magnet further defines a centrally disposed passageway, and which is substantially coaxially aligned with the predetermined linear path of travel, and wherein the magnet further defines an annular shaped passageway having a predetermined diametral dimension, and which is further located radially, outwardly, relative to the centrally disposed passageway, and wherein the cylindrically shaped electrical coil has an outside diametral dimension which is similar to the outside diametral dimension of the annular shaped passageway, and wherein the cylindrically shaped electrical coil is telescopingly received and reciprocally moveable within the annular shaped passageway as the electrical transducer is selectively energized.

12. A vibration generating assembly as claimed in claim 11, and wherein the length dimension of the first and second plurality of elongated leaf springs are the same.

13. A vibration generating assembly as claimed in claim 11, and wherein the length dimension of the first and second plurality of elongated leaf springs are different.

14. A vibration generating assembly as claimed in claim 11, and wherein the electrical transducer, when selectively energized, is operable to exert a force which draws the magnet in a first and an opposite second direction along the predetermined, linear path of travel, and which further forcibly bends, and places into tension or compression, each of the elongated leaf springs, and wherein the electrical transducer when de-energized, allows the respective, elongated leaf springs which have been previously placed into tension or compression, to move the magnet in either the first of the second direction.

15. A vibration generating assembly as claimed in claim 14, and wherein the mounting plate is affixed to the first end of the exterior housing.

16. A vibration generating assembly, comprising:
an exterior housing having opposite first and second ends, and which further defines an internal cavity;
a moveable carriage which is biasingly supported within the internal cavity of the exterior housing, and which is further formed, at least in part, of a multiplicity of elongated, and spaced support members which have opposite ends, and wherein the opposite ends of each of the spaced support members are biasingly affixed to the most closely adjacent, and opposite end of the exterior housing, by a first plurality of elongated, and planar leaf springs, and wherein the moveable carriage further includes a second plurality of elongated, and planar leaf springs which are mounted on the respective support members, and which further extend laterally outwardly relative thereto;
an internal frame having two frame members which are disposed in predetermined, spaced relation, one relative to the other, and wherein each frame member has a polygon-shaped main body which has a peripheral edge, and wherein the main body of each frame member has at least 3 major sides, and 3 principal vertices, and wherein the second plurality of elongated, and planar leaf springs are individually, biasingly affixed to each of the principal vertices of each of the frame members, and wherein the internal frame, and the moveable carriage are each reciprocally moveable within the internal cavity of the exterior housing, one, relative to the other; and
an electrical transducer having a magnet, with a main body, and which has opposite first and second ends, and wherein the magnet is positioned between, and is supported by, the spaced frame members, and wherein the magnet has a given weight, and wherein the magnet further defines an annular shaped passageway which extends from the first end of the magnet, and in the direction of the second end, and wherein the annular shaped passageway has a predetermined diametral dimension, and wherein the electrical transducer further comprises a cylindrically shaped electrical coil which has a predetermined outside diametral dimension, and which allows the cylindrically shaped electrical coil to be telescopingly received, at least in part, within the annular shaped passageway, and wherein the cylindrically shaped electrical coil has a first end which is immovably attached to one end of the exterior housing, and a second end which is received within the annular shaped passageway, and the selective energizing of the transducer by supplying a periodic source of electricity to the cylindrically shaped electrical coil is effective in biasingly reciprocating the magnet along a linear path of travel so as to generate a reciprocating force which is directed along the linear path of travel.

17. A vibration generating assembly as claimed in claim 16, and wherein the respective support members which form, at least in part, a portion of the moveable carriage each have a similar length dimension, and further are located laterally outwardly relative to the internal frame, and wherein the respective support members forming the moveable carriage each have an outwardly facing first surface, an opposite, second surface, and an intermediate portion which is located between the opposite ends thereof, and wherein the first plurality of elongated leaf springs are mounted on the first surface, and are further located near the opposite ends of each of the support members, and further biasingly secures each of the respective support members to one of the first and second ends of the exterior housing, and wherein the second plurality of elongated and planar leaf springs are mounted on the second surface, and further are located on the intermediate portion of each of the respective support members, and which further biasingly secure the respective frame members to the individual support members.

18. A vibration generating assembly as claimed in claim 17, and wherein the first and second plurality of elongated leaf springs each have a first, and an opposite second end, and wherein the first plurality of elongated leaf springs each have a similar length dimension; and the second plurality of elongated leaf springs each have a similar length dimension; and wherein the first end of the first and second plurality of elongated leaf springs are mounted on one of the support members and which forms, at least in part, a portion of the carriage, and the second end of the respective second plurality of elongated leaf springs are individually mounted on each of the respective principal vertices of each of the frame members, and wherein the second plurality of elongated leaf springs are further oriented in a given angular orientation relative to one of the major sides of the respective frame members.

19. A vibration generating assembly as claimed in claim 18, and wherein the second plurality of the elongated leaf springs are oriented in an acutely angular orientation relative to each other, and wherein the respective first and second plurality of leaf springs are disposed in substantially parallel, spaced relation, one relative to the others, and wherein the second plurality of elongated leaf springs are offset relative to the first plurality of elongated leaf springs.

20. A vibration generating assembly as claimed in claim 19, and wherein the reciprocating magnet forms a reciprocally moveable reactive mass which moves along the predetermined linear path of travel without imparting a twisting distortion to the respective first and second plurality of elongated leaf springs, and wherein the reciprocal motion of the magnet which is caused by the periodic energizing of the cylindrically shaped electrical coil, places the respective first and second plurality of elongated and planar leaf springs into tension or compression without any twisting distortion or the respective leaf springs.

21. A vibration generating assembly as claimed in claim 20, and wherein the electrical transducer, when selectively energized, is operable to exert a force which draws the magnet in a first or a second direction along the predetermined, linear path of travel, and which further forcibly bends, and places into tension or compression, each of the elongated leaf springs, and wherein the electrical transducer, when de-energized, allows the respective, elongated leaf springs which have previously been placed into tension or compression, to move the magnet in a first of a second direction in a push-pull action.

* * * * *